United States Patent
Josset et al.

(10) Patent No.: US 12,534,209 B2
(45) Date of Patent: Jan. 27, 2026

(54) AUTONOMOUS AIR CONDITIONING SYSTEM FOR AIRCRAFT

(71) Applicants: Airbus Operations SAS, Toulouse (FR); Airbus SAS, Blagnac (FR); Airbus Operations GmbH, Hamburg (DE)

(72) Inventors: Thomas Josset, Toulouse (FR); Didier Poirier, Blagnac (FR); Holger Bammann, Hamburg (DE)

(73) Assignees: Airbus SAS, Blagnac (FR); Airbus Operations SAS, Toulouse (FR); Airbus Operations GmbH, Hamburg (DE)

( * ) Notice: Subject to any disclaimer, the term of this patent is extended or adjusted under 35 U.S.C. 154(b) by 129 days.

(21) Appl. No.: 18/527,617

(22) Filed: Dec. 4, 2023

(65) Prior Publication Data
US 2024/0294262 A1   Sep. 5, 2024

(30) Foreign Application Priority Data
Dec. 6, 2022  (FR) ...................................... 2212852

(51) Int. Cl.
*B64D 13/06* (2006.01)
(52) U.S. Cl.
CPC ...... *B64D 13/06* (2013.01); *B64D 2013/0618* (2013.01); *B64D 2013/0644* (2013.01);
(Continued)
(58) Field of Classification Search
CPC ............ B64D 13/06; B64D 2013/0618; B64D 2013/0644; B64D 2013/0648; B64D 2013/0659
See application file for complete search history.

(56) References Cited

U.S. PATENT DOCUMENTS

| 6,349,537 B1 | 2/2002 | Newton |
| 2007/0266695 A1 | 11/2007 | Lui et al. |

(Continued)

FOREIGN PATENT DOCUMENTS

| DE | 102013101354 A1 * | 8/2014 | ............ B64D 13/06 |
| EP | 1094212 A2 | 4/2001 | |
| WO | 2022148511 A1 | 7/2022 | |

OTHER PUBLICATIONS

Puschmann, Airplane has compressor whose inlet is connected to fresh air source and outlet is connected with air conditioning unit whose outlet is connected with air distributor of respective associated zone, 2013, Full Document (Year: 2013).*

(Continued)

*Primary Examiner* — Nael N Babaa
(74) *Attorney, Agent, or Firm* — Greer, Burns & Crain, Ltd.

(57) ABSTRACT

An autonomous air conditioning system for an aircraft includes a compressor compressing ambient air and supplying compressed air, a first portion of the compressed air being injected into a cabin of the aircraft so as to condition the cabin air in terms of pressure and of temperature. The autonomous system further includes an electric motor providing mechanical energy to the compressor. The system includes a fuel cells stack supplied with air by a second portion of the compressed air supplied by the compressor and supplying electrical energy, the electric motor being electrically powered with electrical energy supplied by the fuel cells stack. Thus, the cabin air conditioning is performed autonomously, avoiding the need to modify a pre-existing electrical network of the aircraft.

19 Claims, 3 Drawing Sheets

(52) U.S. Cl.
CPC ............... *B64D 2013/0648* (2013.01); *B64D 2013/0659* (2013.01)

(56) References Cited

U.S. PATENT DOCUMENTS

| | | |
|---|---|---|
| 2009/0211273 A1 | 8/2009 | Klewer |
| 2009/0305092 A1 | 12/2009 | Fucke et al. |
| 2017/0170494 A1 | 6/2017 | Lents et al. |
| 2019/0309683 A1* | 10/2019 | Mackin .................. F02C 7/047 |

OTHER PUBLICATIONS

French Search Report for corresponding French Patent Application No. 2212852 dated Jun. 1, 2023; priority document.

* cited by examiner

AUTONOMOUS AIR CONDITIONING SYSTEM FOR AIRCRAFT

CROSS-REFERENCES TO RELATED APPLICATIONS

This application claims the benefit of the French patent application No. 2212852 filed on Dec. 6, 2022, the entire disclosures of which are incorporated herein by way of reference.

FIELD OF THE INVENTION

The present invention relates to the field of aircraft cabin air conditioning in terms of temperature and of pressure, and relates more particularly to an autonomously powered air conditioning system.

BACKGROUND OF THE INVENTION

The production of conditioned air is necessary in an aircraft in order to obtain, in a cabin, pressure and temperature conditions suitable for human beings. Such production of conditioned air is performed by a compression device.

The compression device can be powered by engine bleed air bled from propulsion engines or from auxiliary power units.

However, in some aircraft, engine bleed air is non-existent or cannot be used as a source of energy. It is then necessary to power the compression device electrically, and this can be done by an electrical network of the aircraft. However, the existing electrical networks with which aircraft are equipped use a relatively low AC voltage of 115 V, whereas the compressor requires a DC power supply with also a higher voltage, of 540 V. The supply of electrical energy to the compression device via the aircraft electrical network therefore entails numerous modifications to such an existing electrical network, both in terms of distribution architecture and also in terms of a centralized electrical management device known as the electrical core. Such modifications are particularly restrictive.

It is therefore desirable to overcome these drawbacks of the prior art.

In particular, it is desirable to provide a solution which makes it possible to electrically power the compressor that produces conditioned air, in a simple manner, and without modifying the existing electrical network of the aircraft. It is also desirable to provide a solution that is easy to integrate into the aircraft.

SUMMARY OF THE INVENTION

One object of the present invention is to propose an autonomous air conditioning system for an aircraft, including a primary compressor compressing air bled from outside the aircraft and supplying compressed air, a first portion of the compressed air being injected into a cabin of the aircraft so as to condition the cabin air in terms of pressure and of temperature, and including a first electric motor supplying mechanical energy to the primary compressor. The system further includes a fuel cells stack supplied with air by a second portion of the compressed air supplied by the primary compressor, the fuel cells stack supplying electrical energy to power the first electric motor.

Thus, it is possible to carry out the cabin air conditioning autonomously, with an electrical power supply provided by the autonomous air conditioning system itself, thereby avoiding the need to modify a pre-existing electrical network of the aircraft.

According to one particular embodiment, the system further comprises a first heat exchanger performing exchange of heat between the compressed air supplied by the primary compressor and air bled from outside the aircraft, the first heat exchanger being located downstream of the primary compressor and upstream of the fuel cells stack and of the aircraft cabin.

According to one particular embodiment, the primary compressor is further supplied with mechanical energy by a first turbine, the first turbine receiving at its inlet a third portion of the compressed air supplied by the primary compressor and being located downstream of the first heat exchanger.

According to a particular embodiment, the system further comprises a closed cooling circuit in which a heat transfer fluid circulates. the cooling circuit being arranged to cool the fuel cells stack and the first electric motor and being further arranged to allow exchange of heat between air bled from outside the aircraft and the heat transfer fluid so as to cool the heat transfer fluid.

According to one particular embodiment, the system further comprises a secondary compressor, the secondary compressor being located between the primary compressor and the fuel cells stack and compressing the second portion of the compressed air supplied by the primary compressor.

According to one particular embodiment, the secondary compressor is supplied with mechanical energy by a second turbine, the second turbine receiving at its inlet compressed air coming from the fuel cells stack.

According to one particular embodiment, the system further comprises a second electric motor electrically powered by the electrical energy provided by the fuel cells stack, the second electric motor providing mechanical energy to the secondary compressor.

According to one particular embodiment, the system further comprises a controller configured to implement an algorithm for regulating compressed air temperature, pressure and flow rate parameters and configured to send control commands to active elements of the system providing control functions for the flow rate, pressure and temperature of the compressed air.

According to one particular embodiment, the system further comprises a switch configured to electrically connect to the fuel cells stack, and to do so alternatively, a first electrical assembly and a second electrical assembly, the first electrical assembly being designed to supply electrical power to the system, the second electrical assembly being designed to supply electrical power to equipment external to the system and providing safety functions in the aircraft.

The invention also relates to an aircraft comprising such an autonomous air conditioning system.

BRIEF DESCRIPTION OF THE DRAWINGS

The above-mentioned features of the invention, as well as others, will become more clearly apparent on reading the following description of at least one exemplary embodiment, the description being given with reference to the appended drawings, in which.

DETAILED DESCRIPTION OF THE PREFERRED EMBODIMENTS

Figure 1:
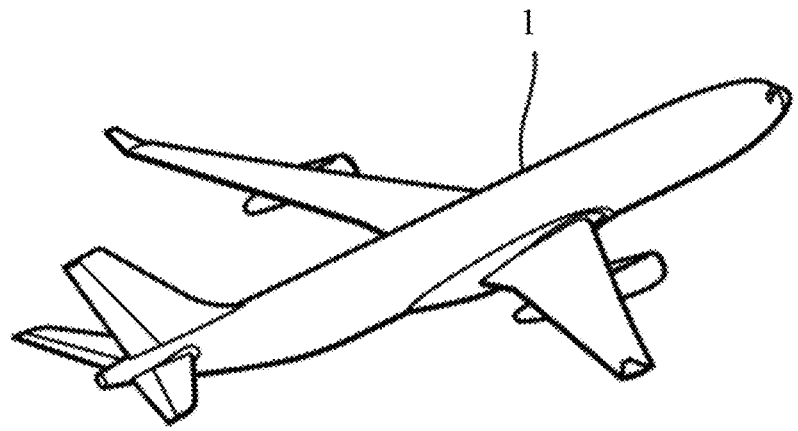
FIG. 1 schematically illustrates an aircraft comprising an autonomous air conditioning system.
Figure 2:
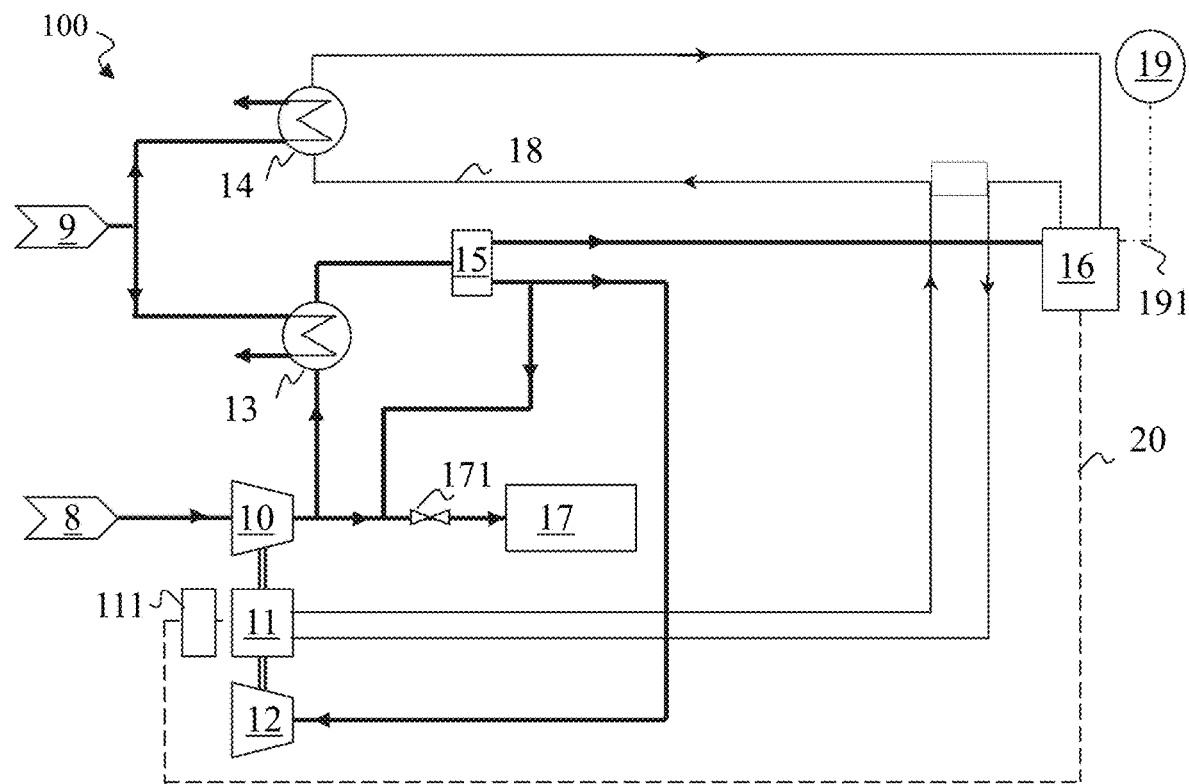
FIG. 2 schematically illustrates the autonomous air conditioning system according to a first embodiment.

FIG. 1 thus schematically illustrates an aircraft 1 comprising at least one autonomous air conditioning system 100 (depicted in FIG. 2). The aircraft 1 preferably comprises two autonomous air conditioning systems 100.

FIG. 2 schematically illustrates the autonomous air conditioning system 100 according to a first embodiment. In this figure, as well as in FIGS. 3A and 3B, the thick continuous lines represent air ducts, the thin continuous lines represent ducts in which a heat transfer fluid circulates, the broken lines represent electrical connections, and the doubled lines represent transmissions of mechanical energy. Molecular-hydrogen pipes 191 are represented by chain lines.

The autonomous air conditioning system 100 comprises a primary compressor 10 receiving ambient air at the inlet and supplying compressed air. The autonomous air conditioning system 100 also comprises a first motor 11 which transmits mechanical energy to the primary compressor 10. In other words, the first motor 11 makes it possible to set in motion elements of the compressor 10 in order to obtain compressed air from ambient air. The first motor 11 is controlled by a first motor control unit 111 (MCU) which determines the power and the speed of rotation of the first motor 11. The autonomous air conditioning system 100 comprises a first air bleed device 8 intended to collect ambient air from outside the aircraft 1. The first air bleed device 8 comprises, for example, one or more scoops making it possible to collect ambient air from outside the aircraft 1. An air duct connects the first air bleed device 8 to the primary compressor 10 in order to inject ambient air into the primary compressor 10.

A first portion of the compressed air supplied by the primary compressor 10 is injected into a cabin 17 of the aircraft 1, either directly at the outlet of the primary compressor 10, or after passing through a first heat exchanger 13 for cooling the compressed air. A valve 171 makes it possible to regulate the flow rate of compressed air injected into the cabin 17. Pressure and temperature conditions suited to human activities can thus be obtained in the cabin 17 in the aircraft 1.

The autonomous air conditioning system 100 also comprises a set of fuel cells 16 ("Fuel cells stack"). The fuel cells stack 16 is supplied with air, which contains, on the one hand, molecular oxygen and, on the other hand, molecular hydrogen, and which supplies electrical energy. The supply of molecular hydrogen comes from a molecular-hydrogen tank 19 situated in the aircraft 1. The molecular-hydrogen tank 19 may belong to the autonomous air conditioning system 100 and be dedicated to the fuel cells stack 16. Alternatively, the molecular-hydrogen tank 19 is external to the autonomous air conditioning system 100 and is also used for other functions requiring a supply of molecular hydrogen, such as the propulsion of the aircraft 1, thereby making it possible to minimize the bulk of the autonomous air conditioning system 100.

The supply of air to the fuel cells stack 16 is effected by compressed air coming from the primary compressor 10. In other words, a second portion of the compressed air supplied by the primary compressor 10 is injected into the fuel cells stack 16. Thus, the primary compressor 10 jointly supplies compressed air to the cabin 17 and to the fuel cells stack 16.

The first air bleed device 8 is therefore used both to condition the cabin 17 air and to enable the fuel cells stack 16 to operate. The use of a single first air bleed device 8 instead of two, one dedicated to the air conditioning of the cabin 17 and one dedicated to the operation of the fuel cells 16, makes it possible to reduce the drag of the aircraft 1.

The electrical energy supplied by the fuel cells stack 16 is collected in an electrical circuit 20 so as to be at least partially transmitted to the first motor 11 and to the first motor control unit 111. The first motor 11 and the first control unit 111 are thus electrically powered by the fuel cells stack 16 and therefore do not require electrical energy from a pre-existing electrical network of the aircraft 1. Thus, the air conditioning of the cabin 17 is carried out autonomously, thereby avoiding the need to modify the pre-existing electrical network of the aircraft 1.

The autonomous air conditioning system 100 comprises the first heat exchanger 13 configured to exchange heat between the compressed air coming from the primary compressor 10, which is warmer, and air, which is cooler, bled from outside the aircraft 1 by a second air bleed device 9. The first heat exchanger 13 thus makes it possible to cool at least a portion of compressed air coming from the primary compressor 10, the compression having caused an increase in the temperature of the air. The first heat exchanger 13 is therefore situated downstream of the primary compressor 10 and is also situated upstream of the fuel cells stack 16.

At the outlet of the primary compressor 10, the portion of compressed air which is not injected directly into the cabin 17 circulates through the first heat exchanger 13 before being injected into the cabin 17. In this case, the first heat exchanger 13 is also situated upstream of the cabin 17.

The autonomous air conditioning system 100 comprises a diffuser 15 which makes it possible to distribute the flow of compressed air leaving the first heat exchanger 13 towards, on the one hand, the fuel cells stack 16 and, on the other hand, towards the cabin 17 and/or towards a first turbine 12 of the autonomous air conditioning system 100.

The first turbine 12 receives at its inlet compressed air coming from the primary compressor 10 and which is neither injected into the fuel cells stack 16 nor injected into the cabin 17. The first turbine 12 expands the compressed air received to recover energy by reducing the pressure of the air. The mechanical energy thus supplied by the first turbine 12 is transmitted to the primary compressor 10, making it possible to increase the compression efficiency of the compressed air. At the outlet of the first turbine 12, the air is released into the atmosphere.

The autonomous air conditioning system 100 further comprises a cooling circuit 18 for cooling the fuel cells stack 16 and the first motor 11. The cooling circuit 18 is a closed circuit and comprises a pipe in which a heat-transfer fluid circulates. The heat transfer fluid circulates successively in a cooling device (not shown) for cooling the fuel cells stack 16, in a cooling device (not shown) for cooling the first motor 11 and in a second heat exchanger 14. The respective devices for cooling the fuel cells stack 16 and the first motor 11 comprise, for example, cooling paths through which the heat transfer fluid passes, which act as heat exchangers and enable heat to be transferred from the fuel cells stack 16 and, respectively, from the first motor 11, towards the heat-transfer fluid. The heat transfer fluid, heated by the heat transfers, then circulates in the second heat exchanger 14. The second heat exchanger 14 makes it possible to transfer heat from the heat transfer fluid to air, which is cooler, bled from outside the aircraft 1 by the second air bleed device 9 in order to cool the heat transfer fluid. The cooling circuit 18 may also comprise other elements, such as a pump for activating the circulation of the heat-transfer fluid and a reservoir of heat-transfer fluid.

Thus, the cooling of the fuel cells stack 16 and of the first motor 11 is shared by means of a single cooling circuit 18, making it possible to reduce the bulk, the weight and the cost of the autonomous air conditioning system 100.

Furthermore, the second air bleed device 9 is used both for air conditioning the cabin 17 and for operation of the fuel cells stack 16. The use of a single second air bleed device 9 instead of two thus makes it possible to reduce the drag of the aircraft 1.

According to one exemplary embodiment, the first air bleed device 8 is a ram air inlet and the second air bleed device 9 is a scoop type air inlet.

The autonomous air conditioning system 100 further comprises a controller 40 (depicted in FIG. 4) which controls elements of the autonomous system 100 and regulates parameters of the compressed air, such as the pressure, temperature, flow rate of air injected into the cabin 17 and the flow rate of air injected into the fuel cells stack 16, in order to obtain compressed air suitable for the air conditioning of the cabin 17 and for the operation of the fuel cells stack 16.

The autonomous air conditioning system 100 may also comprise a dehumidifier (not shown) located between the diffuser 15 and the first turbine 12, in order to reduce the quantity of water present in the compressed air.

Figure 3A:
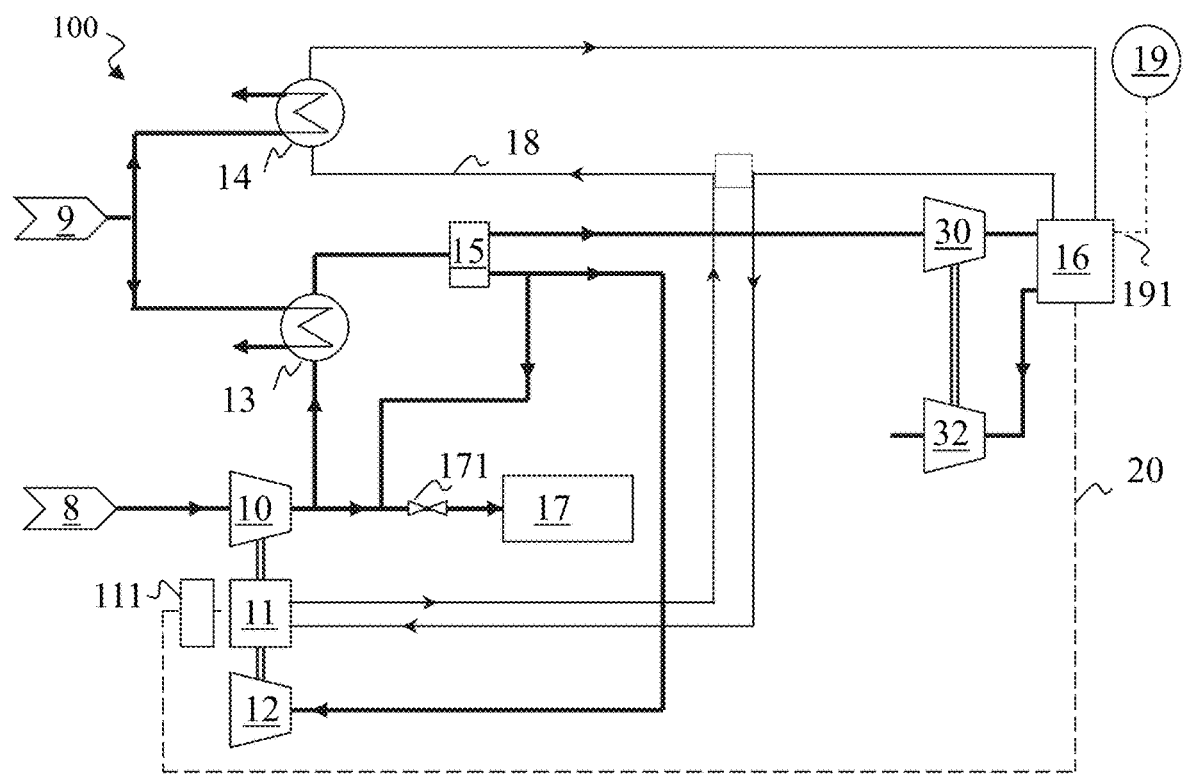
FIG. 3A schematically illustrates the autonomous air conditioning system according to a second embodiment.

FIG. 3A schematically illustrates the autonomous air conditioning system 100 according to a second embodiment.

According to the second embodiment, the autonomous air conditioning system 100 further comprises a secondary compressor 30 situated between the diffuser 15 and the fuel cells stack 16. The secondary compressor 30 makes it possible to compress the second portion of the compressed air coming from the primary compressor 10, in order to increase its pressure and thus obtain pressure conditions suited to the operation of the fuel cells stack 16. For example, the secondary compressor 30 makes it possible to increase the pressure of the compressed air from a pressure of approximately 0.8 bar to a pressure of between 1.2 and 2 bar.

The secondary compressor 30 is thus installed in series with the primary compressor 10, on a pipe for injecting air into the fuel cells stack 16. Since the quantity of air required to supply the fuel cells stack 16 is small compared to the quantity of air required to air-condition the cabin 17, the secondary compressor 30 is smaller than the primary compressor 10. In addition, the volume of the primary compressor 10 is equivalent to that of a compressor which would be used solely for air-conditioning the cabin 17. Thus, the in-series installation of the secondary compressor 30 makes it possible to reduce the weight and the bulk of the autonomous air conditioning system 100 compared with an installation which would employ a compressor specifically for compressing air intended for the fuel cells stack 16, using at inlet air from outside the aircraft. The compressed air supply efficiency is thus improved.

According to the second embodiment, the autonomous air conditioning system 100 further comprises a second turbine 32. The second turbine 32 receives at an inlet air coming from the fuel cells stack 16 and performs an expansion of the air in order to recover energy. The energy supplied by the second turbine 32 is transmitted to the secondary compressor 30 and makes it possible to power the secondary compressor 30.

Figure 3B:
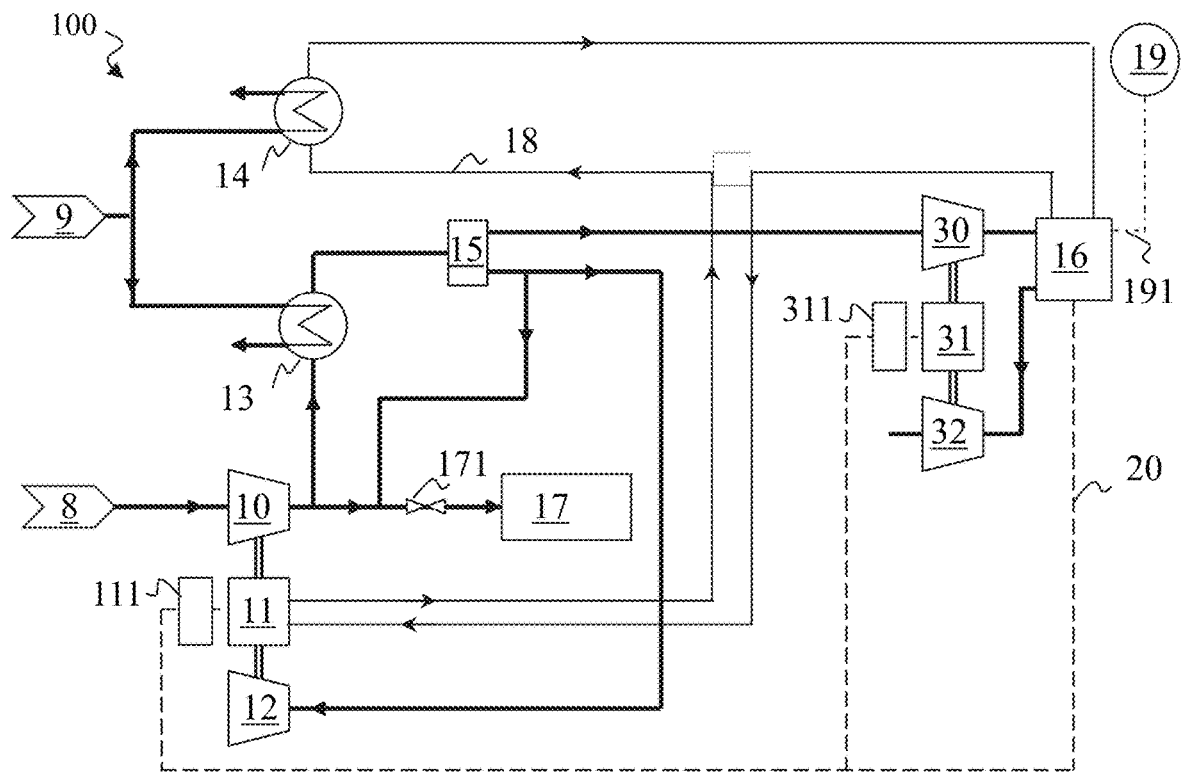
FIG. 3B schematically illustrates the autonomous air conditioning system according to a third embodiment.

FIG. 3B schematically illustrates the autonomous air conditioning system 100 according to a third embodiment.

According to the third embodiment, the autonomous air conditioning system 100 comprises the secondary compressor 30 and the second turbine 32 previously described in relation to FIG. 3A, and further comprises a second motor 31 and a second motor control unit 311 for controlling the second motor 31. The second motor 31 transmits to the secondary compressor 30 mechanical energy which is added to the energy transmitted by the second turbine 32. This makes it possible to obtain for the secondary compressor 30 a power supply that is sufficient for obtaining an air pressure suitable for the operation of the fuel cells stack 16 when the energy recovery permitted by the second turbine 32 is not sufficient.

The second motor 31 and the second motor control unit 311 are electrically powered by the electric circuit 20, in other words by electricity supplied by the fuel cells stack 16. The second motor 31 and the second motor control unit 311 therefore do not require electrical energy from the pre-existing electrical network of the aircraft 1.

The autonomous air conditioning system 100 according to the second and third embodiments may further comprise a third heat exchanger (not shown) to transfer heat from the air exiting the fuel cells stack 16 to the compressed air entering the fuel cells stack, thereby warming the air entering the fuel cells stack. The third heat exchanger is therefore situated, on an air duct at the inlet of the fuel cells stack 16, downstream of the secondary compressor 30, and situated, on an air duct at the outlet of the fuel cells stack 16, upstream of the second turbine 32.

Figure 4:
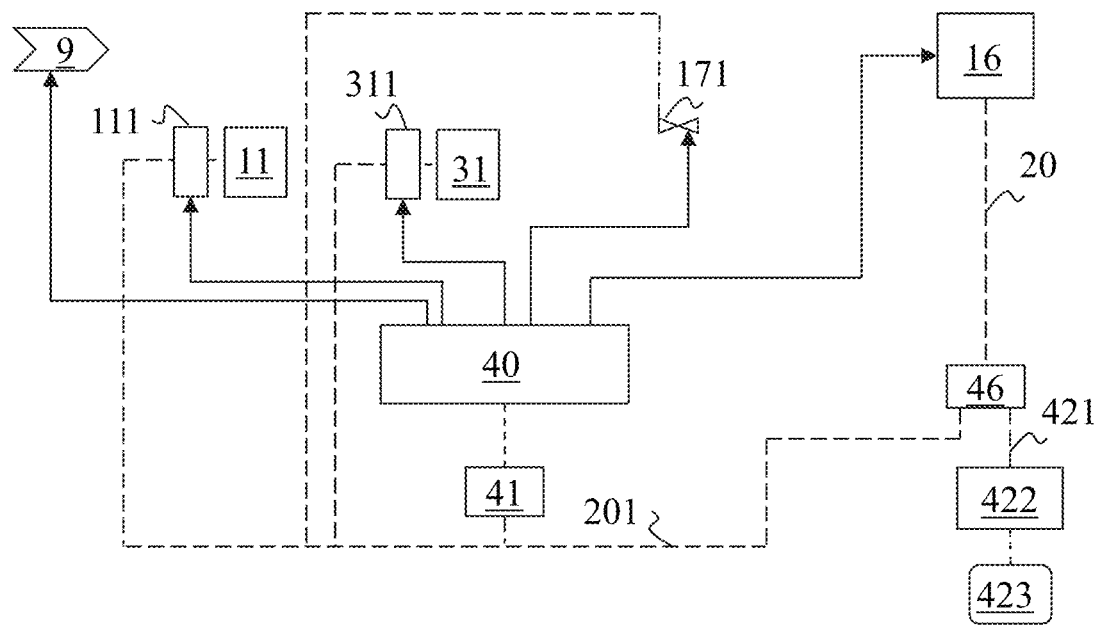
FIG. 4 schematically illustrates a controller of the autonomous air conditioning system and elements of the autonomous air conditioning system, and FIG. 5 schematically illustrates an example of the controller hardware architecture.

FIG. 4 schematically illustrates a controller 40 of the autonomous air conditioning system 100 and other elements of the autonomous air conditioning system 100.

The controller 40 controls elements of the autonomous air conditioning system 100, referred to as active elements, by transmitting control instructions via communication links shown in FIG. 4 by arrows drawn in unbroken line. The broken lines in FIG. 4 represent electrical connections.

The active elements controlled by the controller 40 perform functions necessary for the operation of the autonomous air conditioning system 100, such as air compression, fluid flow rate management, fluid or device thermal management, and air humidity management. The active elements thus make it possible to vary parameters such as the flow rate, pressure and temperature of the compressed air. According to an embodiment shown in FIG. 4, the controller 40 controls the second air bleed device 9, the first motor control unit 111, the second motor control unit 311 when there is one, the valve 171, the fuel cells stack 16 comprising valves for controlling the flow rate of air and of molecular hydrogen.

Instructions sent by the controller 40 to the first motor control unit 111 make it possible, for example, to adjust the power or the speed of the motor, in order to vary the pressure and the temperature of compressed air at the outlet of the first compressor 10.

Instructions sent by the controller 40 to the second air bleed device 9 make it possible, for example, to modify the flow rate of incoming air, in order to vary the temperature of the heat transfer fluid and to vary the temperature of the compressed air leaving the first heat exchanger 13.

Instructions sent by the controller 40 to the valve 171 make it possible to adjust the compressed air flow rate at the inlet of the cabin 17.

Instructions sent by the controller 40 to the second motor control unit 311 make it possible, for example, to adjust the power or the speed of the second motor 31, in order to vary the pressure and the temperature of compressed air at the inlet of the fuel cells stack 16.

Instructions sent by the controller 40 to the fuel cells stack 16 make it possible, for example, to modify the flow rate of air entering the fuel cells stack 16 and/or the flow rate of molecular hydrogen entering the fuel cells stack 16, for example by means of valves (not shown).

The controller 40 is also capable of implementing an algorithm for regulating one or more predefined parameters such as the pressure and temperature of compressed air injected into the cabin 17, the pressure and temperature of compressed air injected into the fuel cells stack 16, the flow rate of compressed air injected into the cabin 17, the flow rate of compressed air injected into the fuel cells stack 16 or the electrical power supplied by the fuel cells stack 16. For this purpose, the controller 40 receives information from sensors, such as pressure, temperature or flow rate sensors located, for example, on air ducts at the inlet of the cabin 17 and at the inlet of the fuel cells stack 16 or electrical power sensors. The implementation of a regulation algorithm by the controller 40 involves processing data from the sensors and sending control instructions to the active elements of the autonomous air conditioning system 100.

The controller 40 is electrically powered by the fuel cells stack 16. The electrical circuit 20 comprises a voltage converter 41 enabling a low DC voltage, for example of 28 V, to be supplied to the controller 40.

According to one embodiment, the electrical circuit 20 further comprises a switch 46. The switch 46 can electrically connect the electrical circuit 20 connected to the fuel cells stack 16, either to a first electrical assembly 201 powering the autonomous air conditioning system 100, or to a second electrical assembly 420 powering priority electrical loads 423. The first electrical assembly 201 comprises electrical connections supplying power to the first and second motor control units 111, 311, to the first and second motors 11, 31, to the controller 40 and may also comprise electrical connections supplying power to valves, for example the valve 171.

The second electrical assembly 420 supplies power to the priority electrical loads 423. A converter 422 is used to obtain an alternating current at a voltage adapted to the priority electrical loads 423. The priority electrical loads 423 are equipment external to the autonomous air conditioning system 100 and managing safety functions, thus ensuring the safety of the aircraft 1 and of the passengers. The priority electrical loads 423 are, for example, equipment used to pilot the aircraft 1 or to control the altitude of the aircraft 1.

The switch 46 is controlled by a control unit (not shown). When an emergency situation is detected, for example when an alarm is received, the control unit transmits a switching instruction to the switch 46 in order to stop the power supply to the autonomous air conditioning system 100 and to supply power to the priority electrical loads 423. Conversely, when the control unit detects the end of an emergency situation, the control unit transmits a switching instruction to the switch 46 to stop the supply of power to the priority electrical loads 423 and to restore power to the autonomous air conditioning system 100.

Thus, the fuel cells stack 16 of the autonomous air conditioning system 100 can be used as an emergency power supply. In addition, the emergency electrical power supply can become available in a very short time corresponding to the switching time, for example less than one second, since the fuel cells stack 16 is already in operation when an emergency situation is detected by the control unit controlling the switch 46.

According to one embodiment, the aircraft 1 comprises two autonomous air conditioning systems 100 each comprising a switch 46 and comprises a control unit common to the two switches 46. The common control unit, when an emergency situation is detected, maintains the supply of power to the air conditioning functions of one of the two autonomous air conditioning systems 100, and sends a switching instruction to the switch 46 of the other of the two autonomous air conditioning systems 100 to supply power to the priority electrical loads 423. Thus, it is possible to ensure the functions of safety of the priority electrical loads 423 while allowing the supply of conditioned air to the cabin 17.

Figure 5:
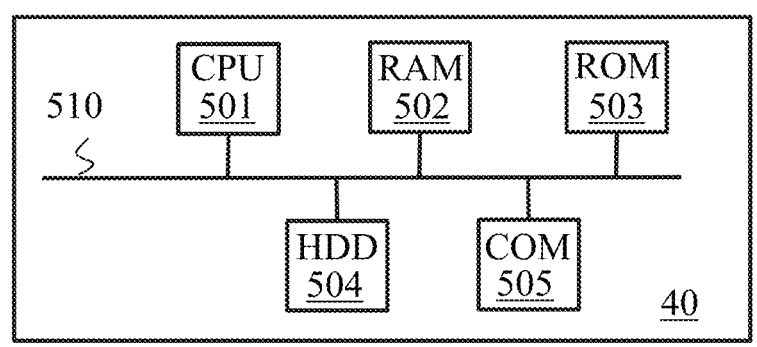

FIG. 5 schematically illustrates an example of the hardware architecture of the controller 40. The controller 40 then comprises, connected by a communication bus 510: a Central Processing Unit (CPU) 501; a Random Access Memory (RAM) 502; a Read Only Memory (ROM) 503; a storage unit or storage media drive, such as a Hard Disk Drive (HDD) 504; and an interface 505 for communicating with the active elements of the autonomous air conditioning system 100 and with sensors installed in the autonomous air conditioning system 100.

The processor 501 is capable of executing instructions loaded into the RAM 502 from the ROM 503, an external memory (not shown), a storage medium, or a communication network. When the controller 40 is powered on, the processor 501 is capable of reading instructions from the RAM 502 and of executing them. These instructions form a computer program causing the implementation, by the processor 501, of all or part of the algorithms and steps described here in relation to the controller 40.

Thus, all or some of the algorithms and steps described here in relation to the controller 40 can be implemented in software form by a programmable machine, such as a DSP (Digital Signal Processor) or a microcontroller executing a set of instructions, or in hardware form by a dedicated machine or component, such as an FPGA (Field-Programmable Gate Array) or an ASIC (Application-Specific Integrated Circuit). Thus, in general, the controller 40 comprises electronic circuitry adapted and configured to implement the algorithms and steps described here in relation to the controller 40.

The systems and devices described herein may include a controller, control unit, such as motor control units 111, 311 and the switch control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An autonomous air conditioning system for an aircraft, comprising:
   a primary compressor compressing air bled from outside the aircraft and supplying compressed air, a first portion of said compressed air being injected into a cabin of the aircraft so as to condition cabin air in terms of pressure and of temperature,
   a first electric motor supplying mechanical energy to the primary compressor,
   a fuel cells stack supplied with air by a second portion of the compressed air supplied by the primary compressor, the fuel cells stack supplying electrical energy to power the first electric motor, and
   a closed cooling circuit in which a heat transfer fluid cools the fuel cells stack and the first electric motor by circulating between the fuel cells stack and the first electric motor,
   wherein the closed cooling circuit allows exchange of heat between air bled from outside the aircraft and the heat transfer fluid so as to cool the heat transfer fluid.

2. The autonomous air conditioning system according to claim 1, further comprising a first heat exchanger performing exchange of heat between the compressed air supplied by the primary compressor and air bled from outside the aircraft, the first heat exchanger being located downstream of the primary compressor and upstream of the fuel cells stack and of the aircraft cabin.

3. The autonomous air conditioning system according to claim 2, wherein the primary compressor is further supplied with mechanical energy by a first turbine, the first turbine receiving at its inlet a third portion of the compressed air supplied by the primary compressor and being located downstream of the first heat exchanger.

4. The autonomous air conditioning system according to claim 1, further comprising a secondary compressor, the secondary compressor being located between the primary compressor and the fuel cells stack and compressing the second portion of the compressed air supplied by the primary compressor.

5. The autonomous air conditioning system according to claim 4, wherein the secondary compressor is supplied with mechanical energy by a second turbine, the second turbine receiving at its inlet compressed air coming from the fuel cells stack.

6. The autonomous air conditioning system according to claim 5, further comprising a second electric motor electrically powered by the electrical energy supplied by the fuel cells stack, the second electric motor providing mechanical energy to the secondary compressor.

7. The autonomous air conditioning system according to claim 1, further comprising a controller configured to implement an algorithm to regulate compressed air temperature, pressure and flow rate parameters and configured to send control commands to active elements of the system providing control functions for the flow rate, pressure and temperature of the compressed air.

8. The autonomous air conditioning system according to claim 1, further comprising a switch configured to electrically connect to the fuel cells stack, and to do so alternatively, a first electrical assembly and a second electrical assembly, the first electrical assembly being configured to supply electrical power to the system, the second electrical assembly being configured to supply electrical energy to equipment external to the system and providing safety functions in the aircraft.

9. An aircraft comprising at least one autonomous air conditioning system according to claim 1.

10. The autonomous air conditioning system according to claim 2, further comprising a first air bleed device, a second heat exchanger configured to transfer heat from the heat transfer fluid to air, which is cooler, bled from outside the aircraft by a second air bleed device in order to cool the heat transfer fluid, and a third heat exchanger configured to transfer heat from air exiting the fuel cells stack to the compressed air entering the fuel cells stack, thereby warming the air entering the fuel cells stack.

11. The autonomous air conditioning system according to claim 10, wherein the first air bleed device is a ram air inlet and the second air bleed device is a scoop inlet.

12. The autonomous air conditioning system according to claim 3, further comprising a diffuser configured to distribute the compressed air leaving the first heat exchanger towards the fuel cells stack and towards the cabin.

13. The autonomous air conditioning system according to claim 12, further comprising a dehumidifier located between the diffuser and the first turbine, and configured to reduce a quantity of water present in the compressed air.

14. The autonomous air conditioning system according to claim 7, wherein the controller is further configured to send instructions to a valve to adjust the flow rate of the compressed air at an inlet of the cabin.

15. The autonomous air conditioning system according to claim 8, wherein the first electrical assembly further comprises electrical connections supplying power to at least one valve.

16. The autonomous air conditioning system according to claim 8, further comprising a converter configured to obtain an alternating current at a voltage adapted to priority electrical energy loads.

17. The autonomous air conditioning system according to claim 8, further comprising a switch configured to electrically connect to the fuel cells stack, and a control unit configured to control the switch.

18. The autonomous air conditioning system according to claim 17, wherein the control unit transmits a switching instruction to the switch when an emergency situation is detected and when the emergency situation ends.

19. An aircraft comprising:
a primary compressor compressing air bled from outside the aircraft and supplying compressed air, a first portion of said compressed air being injected into a cabin of the aircraft so as to condition cabin air in terms of pressure and of temperature,
a first electric motor supplying mechanical energy to the primary compressor,
a fuel cells stack supplied with air by a second portion of the compressed air supplied by the primary compressor, the fuel cells stack supplying electrical energy to power the first electric motor, and
a switch configured to electrically connect to the fuel cells stack, and to do so alternatively, a first electrical assembly and a second electrical assembly, the first electrical assembly being configured to supply electrical power to the system, the second electrical assembly being configured to supply electrical energy to equipment external to the system and providing safety functions in the aircraft;
wherein the switch is controlled by a control unit and the control unit is configured to upon detection of an emergency situation corresponding to the reception of an alarm, transmit a switching instruction to the switch to stop the power supply to an autonomous system and to power a priority electrical loads, and upon detection of the end of an emergency situation, transmit a switching instruction to the switch to stop the power supply to the priority electrical loads and to power the autonomous system.

* * * * *